T. A. WILLARD.
SEPARATOR FOR STORAGE BATTERIES AND PROCESS OF PRODUCING THE SAME.
APPLICATION FILED JUNE 30, 1914.
1,243,368. Patented Oct. 16, 1917.
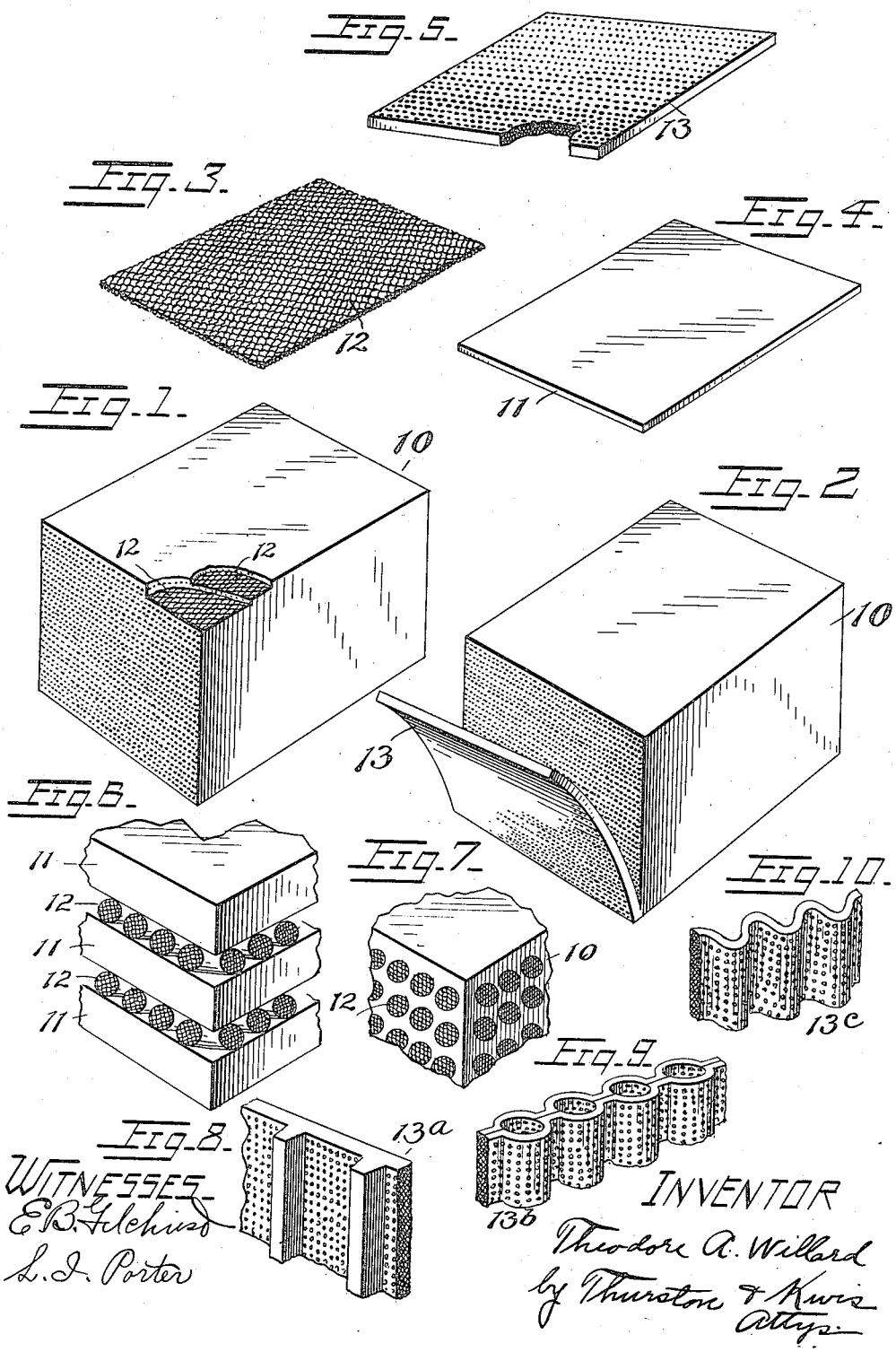

UNITED STATES PATENT OFFICE.

THEODORE A. WILLARD, OF CLEVELAND, OHIO.

SEPARATOR FOR STORAGE BATTERIES AND PROCESS OF PRODUCING THE SAME.

1,243,368.

Specification of Letters Patent.

Patented Oct. 16, 1917.

Application filed June 30, 1914. Serial No. 848,296.

*To all whom it may concern:*

Be it known that I, THEODORE A. WILLARD, a citizen of the United States, residing at Cleveland, in the county of Cuyahoga and State of Ohio, have invented a certain new and useful Improvement in Separators for Storage Batteries and Processes of Producing the Same, of which the following is a full, clear, and exact description.

This invention relates to storage battery separators and to the process of making the same.

A satisfactory separator should be formed of insulating material, and should be sufficiently porous that the battery as a whole will have a low internal resistance, but the pores in this separator should be sufficiently small and numerous that while they permit the battery solution and current to pass freely through the separator, they should prevent the passage therethrough of the oxids of lead. Additionally, the separators should be durable and have life co-extensive with the other parts of the battery.

The best separators used heretofore are made of wood or hard rubber, although some have been made also from other materials such as celluloid. The wood separator is perhaps the most efficient, but has a serious objection that it is not durable, its life being comparatively short. Rubber separators while more durable than the wood separators are expensive, due chiefly to the necessity of perforating them, and have the objection also that the perforations cannot be made sufficiently small or numerous to give the best results. Separators made of other materials, while perhaps satisfactory in some respects are objectionable in other respects. For example, a separator of celluloid is very inflammable, and for that reason its use is often prohibited.

The object of the invention is to provide a durable and inexpensive separator in which the pores or holes are very small and numerous, making a very porous diaphragm of high conductivity.

In carrying out my invention, I provide a separator of sufficiently durable material, such as rubber, and provide porosity preferably by embedding in the material composing the body of the separator and in such a manner as to extend from one side thereof to the other, material such as woven cloth, threads, hair, fiber and the like which is porous, or other material which can under suitable treatment be made porous.

These separators are preferably made by forming what may be termed a composite block composed of some suitable binding or cementing material, such as rubber and the porosity yielding material such as above mentioned, and thence by cutting, shaving, or sawing the block into sections of a thickness suitable for the separators or for forming the separators, if the slices or sections are to be treated or shaped subsequently to the severing thereof from the block. The block is cut or sawed in such a way that a porosity yielding material will extend transversely of the separator, or from face to face thereof, it being unnecessary that it extend through the separator at right angles to the faces or sides thereof.

My invention may be briefly summarized as consisting in a separator having a certain construction and characteristics and in certain novel steps of the herein described process of producing the same.

In the accompanying sheet of drawings where I have shown separators formed in accordance with my invention and have illustrated the manner in which they are formed, Figure 1 represents what I term the composite block from which the separators which are finally produced are cut, sawed or otherwise severed from the block; Fig. 2 is a similar view illustrating the manner in which the separator sections may be severed from the block; Figs. 3 and 4 are perspective views respectively of sections or layers of coarse woven cloth and plastic cementing material, a suitable number of which are superimposed and alternately arranged so as to form the composite block; Fig. 5 is a perspective view of a separator section severed from the block; Fig. 6 is an enlarged view of a portion of the block showing the superimposed and alternately arranged layers of cloth and rubber or other suitable cementing material preferably in plastic state before the block has been compressed; Fig. 7 is a similar view showing the same after compression and after the plastic material has been squeezed through and has filled the meshes or interstices of the porosity yielding material; Figs. 8, 9 and 10 are perspective views of portions of separators constructed in accordance with my invention, these views illustrating some of the numerous shapes that the finished separator may assume.

Referring now to the figures of the drawings, 10 represents what I have previously termed a composite block which may be formed in any indeterminate length, and having cross sectional dimensions corresponding substantially to the width and height of a storage battery separator. This block is built up of superimposed layers or sheets 11 of suitable cementing material, with porosity producing material, which may be in the form of sheets 12, between the layers or sheets 11. Describing this block from a slightly different viewpoint, it is formed of alternately arranged sheets or layers of cementing material 11 adapted to form the body of the separator and sheets or layers 12 which are adapted to produce the pores through the body of the separator.

For the material 11 I prefer to use rubber or rubber compound, the materials or ingredients of which are mixed so that hard rubber may eventually be produced therefrom, and thence the compound is rolled into thin sheets, preferably of about 1/100 of an inch in thickness, which are cut to proper dimensions. I do not wish to confine my invention, however, to the use of rubber, for as before stated other materials may be used, although I believe not so effectively as rubber. As examples of other material which may be used, I might mention bakelite and celluloid.

For the porosity producing material I prefer to use a coarse woven cloth such as "scrim," which is preferably cut on the bias, as illustrated in Fig. 3, and in sections of the same or substantially the same size as the sections 11 which form the body of the block or of the separators which are to be severed therefrom. Instead of using woven cloth I may use to good advantage haircloth, or I may use unwoven hair or unwoven threads, strands, or fibers or the like. I may also use to advantage thin strands of wood or other fibrous material which it will be understood will be placed between the successive layers or sheets 11. The above mentioned materials are all more or less porous, but I do not wish to be confined to the same as I may employ non porous material, such as fine wire or wire gauze, which by suitable acid treatment will render the separator porous, as will be explained.

After the block is built up in the manner above described, it is subjected to pressure, so that the material of the layers 11 will be squeezed in between the threads or strands filling all the previously open interstices, and so that the material of the layers 11 will be thoroughly united in a more or less solid body in which is embedded the porosity producing material, and if rubber is utilized to form the body of the block, the latter is then put into a vulcanizer and vulcanized either into soft or hard rubber, as desired, the layers being thoroughly vulcanized together through the interstices of the interposed porosity producing material.

Next, the block is shaved, cut or sawed into sections 13 of the proper thickness for storage battery separators, the block being cut at right angles to the layers of which the block is built up or in planes at right angles to the planes of the porosity producing layers or material, so that extending through each separator section thus severed from the block there will be numerous minute threads or strands of porous material. When strips or sections 12 of woven cloth are utilized and are cut on the bias, as shown in Figs. 1 and 3, the threads which extend through the separator sections severed from the block in the manner above described will not extend from face to face of the separator section at right angles thereto, but will extend through the section diagonally. This is preferred, although of course the threads or strands may run from side to side of the separator section at right angles thereto.

The separator sections severed from the block in the manner above described may then be molded in any desired shape, as illustrated at $13^a$, $13^b$ and $13^c$ in Figs. 8, 9 and 10, and will be vulcanized (if necessary) so as to produce hard finished separators, each of which will be a very porous diaphragm having pores of any size required down to the most minute threads.

As before stated, the block may be vulcanized into hard rubber, or assuming that bakelite or other material than rubber is utilized, the block may be formed into a permanent hard state before it is cut or severed into the separator sections. The block will then be sliced or sawed and the surfaces of the sawed separators may be ground to produce ribs (if desired), or the separator sections may be left flat and ribs may be molded or attached to the surface or surfaces.

It will be understood that the finished separator may be formed into other shapes than here illustrated. For example, it may be in the form of a receptacle to hold a plate or a portion of a plate or an electrode, or it may be formed and used as a porous diaphragm in any part of the battery requiring such materials.

As before stated, wood strands may be utilized instead of the woven cloth to produce the pores in the separator. Such separator corresponds in utility to the regular wood separator, but has many times its life, due to the fact that each subdivision containing wood is a perfect support for the wood allowing the wood ingredient or filling to be used up to its utmost limit of life throughout which it will possess the necessary mechanical strength.

The separator containing the inert porous material above described may be treated in a solution of acid or acids to render the inert material soft and more porous than in its natural state, although the separators will have high efficiency without such treatment. For example, the major portion of the porous materials above mentioned may be converted into cellulose or carbon by treating the separator with the proper kinds of acids. If the separator is thus treated it will subsequently be affected very little by the acid used in the battery solution. In the event that I use for the porosity producing material, material which originally is not porous, such as metal gauze or fine steel wire, to render the separator porous, it will be treated with acid such as sulfuric acid which will dissolve out the fine strands of metal leaving minute pores.

By the above process I am able to produce a separator which I believe to be superior to anything which has heretofore been used. The separator is not only extremely porous, but the pores are exceedingly fine and it is possible to increase the number of pores or perforations to the maximum without material danger of breakage.

In a companion application, Serial No. 5,588, filed February 1, 1915 for storage battery separators and process of producing the same, I have disclosed a separator and a process which in certain respects are similar to the separator and process of this application. In the companion application referred to, the block or body from which the separator sections are cut, instead of being formed from alternate layers of rubber and pore producing material as disclosed in this case, is formed from pore producing material which is coated or impregnated with rubber or cementitious material.

Having thus described my invention, what I claim is:—

1. A storage battery separator composed of a binding material and porous material extending from side to side through the separator and forming a permanent part thereof.

2. A separator blank for storage batteries having porosity producing material extending substantially uniformly from side to side through the same.

3. A separator blank for storage batteries comprising a body containing pore producing material extending substantially directly from side to side through the same.

4. A separator for storage batteries composed of non porous material and finely divided pore producing material extending in substantially straight lines from side to side thereof.

5. A separator for storage batteries formed from hardened plastic material and pore producing material extending substantially uniformly through the separator.

6. A separator for storage batteries formed from rubber compound and closely arranged porous material extending in a general direction from one side of the separator to the other.

7. A separator for storage batteries composed of non-porous material rendered porous by the presence of finely divided porous material arranged in layers.

8. A separator for storage batteries formed of non porous binding material and porous material consisting of strands whose ends are exposed and substantially uniformly distributed over the sides of the separator.

9. A storage battery separator composed of porous material extending from side to side through the separator, and a cementing material.

10. A storage battery separator composed of porous material extending transversely therethrough, and rubber as a binding agent.

11. A storage battery separator composed of threads extending transversely therethrough, and rubber as a binding agent.

12. The method of producing separators for storage batteries which consists in embedding in a mass of separator material, material for producing pores and cutting said mass into separator sections.

13. The method of producing separators for storage batteries which comprises forming a composite body of non-porous material and porous material, and cutting the body into sections suitable for the separators.

14. The method of producing separators for storage batteries which comprises forming a body of binding material and material for forming pores and cutting the body into sections so that the pore forming material will extend from side to side through the sections.

15. The method of producing separator blanks for storage batteries which comprises forming a body of rubber compound and pore producing material and cutting said body into separator sections in such a manner that the pore producing material extends through the sections from side to side thereof.

16. The method of producing separators for storage batteries which comprises forming a body from binding material and closely arranged porous material, and slicing said body in parallel planes so as to produce flat separator sections having the porous material extending from side to side through the same.

17. The method of producing separators for storage batteries which comprises forming a composite body of porous material and non porous material, and slicing the body at substantially right angles to the porous material.

18. The method of producing separators for storage batteries which comprises forming a body of layers of porous material and a binding material, and slicing the body into sections at right angles to the layers.

In testimony whereof, I hereunto affix my signature in the presence of two witnesses.

THEODORE A. WILLARD.

Witnesses:
L. I. PORTER,
A. F. KWIS.